sensor also includes a signal processing circuit, for example signal adding (8), amplifying, converting (9) and/or evaluating circuits (10), fed by at least one signal provided by at least one component of the coil system. The inductive sensor comprises a direct or indirect feedback line (11) from the secondary coil or winding (3) to the input of the operational amplifier (6) of the generator (5).

17 Claims, 6 Drawing Sheets

(12) United States Patent
Kirchdoerffer et al.

(10) Patent No.: US 7,994,778 B2
(45) Date of Patent: Aug. 9, 2011

(54) INDUCTIVE PRESENCE OR POSITION SENSOR FOR DETECTING BOTH FERROUS AND NON-FERROUS METALS

(75) Inventors: Rémy Kirchdoerffer, Vufflens le Chateau (CH); Vladimir Frolov, Strasbourg (FR)

(73) Assignee: Senstronic SA, Saverne (FR)

( * ) Notice: Subject to any disclaimer, the term of this patent is extended or adjusted under 35 U.S.C. 154(b) by 654 days.

(21) Appl. No.: 12/072,711

(22) Filed: Feb. 27, 2008

(65) Prior Publication Data

US 2009/0039873 A1  Feb. 12, 2009

(30) Foreign Application Priority Data

Feb. 27, 2007  (EP) .................................. 07360008

(51) Int. Cl.
*G01B 7/14* (2006.01)
*G01N 27/82* (2006.01)

(52) U.S. Cl. ............. 324/207.26; 324/237; 324/207.12; 324/207.17

(58) Field of Classification Search .................. None
See application file for complete search history.

(56) References Cited

U.S. PATENT DOCUMENTS

| | | | |
|---|---|---|---|
| 3,503,008 A | 3/1970 | Delignieres | 331/117 |
| 4,857,919 A | 8/1989 | Braswell | 340/870.36 |
| 4,942,372 A | 7/1990 | Heimlicher | 331/65 |
| 5,027,066 A | 6/1991 | Reder | 324/207.16 |
| 5,504,425 A | 4/1996 | Fericean et al. | 324/207.16 |
| 5,519,317 A | 5/1996 | Guichard et al. | 324/236 |
| 5,592,822 A | 1/1997 | Stubbs | 62/51.2 |
| 6,215,365 B1 | 4/2001 | Kurkovskiy | 331/65 |
| 6,335,619 B1 | 1/2002 | Schwab et al. | 324/207.26 |
| 6,664,781 B2 | 12/2003 | Machul | 324/207.12 |
| 7,068,028 B2 * | 6/2006 | Reining | 324/207.26 |
| 2006/0119351 A1 | 6/2006 | James et al. | 324/207.17 |

FOREIGN PATENT DOCUMENTS

| | | |
|---|---|---|
| DE | 40 31 252 C1 | 10/1991 |
| EP | 0 304 272 A2 | 2/1989 |
| EP | 0 403 733 A1 | 12/1990 |
| EP | 1 580 536 A1 | 9/2005 |
| EP | 1 580 889 A1 | 9/2005 |
| EP | 1 591 766 A2 | 11/2005 |
| EP | 1 686 397 A1 | 8/2006 |
| EP | 1 687 680 A1 | 8/2006 |
| EP | 1 742 362 A1 | 1/2007 |
| EP | 1 862 824 A1 | 12/2007 |
| GB | 2394293 | 4/2004 |
| WO | WO 00/76070 A1 | 12/2000 |

* cited by examiner

*Primary Examiner* — Jay M Patidar
(74) *Attorney, Agent, or Firm* — Fay Sharpe LLP

(57) ABSTRACT

An inductive sensor or detector includes as its sensitive element, preferably defining a front working plane of the sensor, a coil system forming an air-core transformer arrangement with a primary coil or winding (2) and a secondary coil or winding (3). The primary coil or winding of the system is associated with a capacitive component (4) in order to constitute a LC oscillating circuit whose oscillation is sustained by an adapted generator (5) in the form of an operational amplifier (6) and an associated resistance arrangement (R, R5, R13). The sensor also includes a signal processing circuit, for example signal adding (8), amplifying, converting (9) and/or evaluating circuits (10), fed by at least one signal provided by at least one component of the coil system. The inductive sensor comprises a direct or indirect feedback line (11) from the secondary coil or winding (3) to the input of the operational amplifier (6) of the generator (5).

INDUCTIVE PRESENCE OR POSITION SENSOR FOR DETECTING BOTH FERROUS AND NON-FERROUS METALS

BACKGROUND

The present application concerns the field of electromagnetic based detection and sensing, in particular in an industrial environment, and relates particularly to an inductive proximity sensor, detector or switch, which can work in a magnetic field and can detect both ferrous and non-ferrous metals.

More specifically, the present application concerns in particular an inductive sensor or detector of the type comprising:

- an inductive coil defining a front working plane of the sensor and associated with a covering plate or a plane part of a housing, said plate or part being disposed substantially perpendicular to the coil axis and parallel to its front working plane,
- means for supplying the coil or inductance repeatedly with current,
- means for processing signals which correspond to the voltages induced in said coil or inductance when fed, said induced voltages being influenced by the presence of objects or articles (targets) situated within a given detection area of said sensor.

Inductive proximity sensors using a coil as the sensitive element are already known. The working principals of this type of sensors are as follows.

When the coil with its associated flux field is placed close to the conductive target, the field establishes electric currents in the target. These currents are eddy currents, i.e. closed loops of induced current circulating (in a direction opposite to the current in the coil) in planes perpendicular to the magnetic flux, and generating their own magnetic field. Eddy currents normally run parallel to the coil windings and to the target surface. The eddy current flow is limited to the area in the target within the inducing magnetic field (see FIG. 1).

The magnetic flux associated with the eddy currents opposes the coil's own magnetic flux. Decreasing the target-to-coil gap changes the inductance of the coil and thus the net flux of the system. The result is a change in the impedance of the coil and a voltage change across the coil. It is this interaction between the coil and the eddy current fields that is the basis for determining target-to-coil position information with an eddy current position sensor.

The most common way of converting the impedance of the coil into electrical signal parameters is to make an LC generator with the inductance coil L as its sensing element. As the impedance of the inductance coil changes, parameters of the periodic signal at the output of the generator, such as amplitude and frequency, also change; thus making it possible, by providing a suitable electronic circuit, to detect a target as it approaches the sensing element of a detector. Similar designs were used in detectors described in the following patent and patent application documents: U.S. Pat. Nos. 4,942,372, 6,215,365, 6,664,781, DE-A-40 31 252, EP-A-0 304 272, 5,504,425, 6,335,619, 5,519,317, 5,952,822, EP-A-0 403 733, WO-A-00/76070.

As closest prior art, U.S. Pat. No. 5,027,066 discloses a distance detecting circuit that generates an electrical signal proportional to the linear displacement of an object. The functional diagram of the concerned device is shown in FIG. 4 of said document and the concerned detector is actually a generator built around an operational amplifier 67. Resistors R4 and R5 are used to set the required gain of the amplifier. The output of the amplifier is connected via resistor R6 to an oscillating LC-circuit (elements 71 and 65). Coil 65 is the primary winding of the transformer and its secondary windings 63 and 64 are connected to said primary winding via a moving core 18. The linear movement of the core 18 changes the amount of induction factor between the transformer windings. Correspondingly, signal parameters change at the input of the detecting device 24 and the latter generates a voltage at its output that is proportional to the linear displacement of the core linked mechanically to the object.

The present application proposes an inductive position detector or sensor which shows at least some of the following improvements and additional features in comparison with the detectors known from the aforementioned documents, in particular from U.S. Pat. No. 5,027,066:

1. The detector or sensor should detect the presence of a target located at a certain distance in front of it whether this target is made of any ferromagnetic metal or of any non-ferrous/non-ferromagnetic metal.
2. The detector or sensor should be able to differentiate these two types of targets (ferromagnetic/non-ferrous).
3. The detector or sensor should remain operational when exposed to the effect of a constant or alternating magnetic field of industrial frequency.
4. The design of the detector or sensor should allow for its flush mounting with the frame of any material.
5. The sensor should be able to detect and evaluate an approaching article or object without any physical connection with the latter.

It is an aim of the present application to propose an inductive proximity (presence or position) sensor or detector showing at least some of the aforementioned benefits or improvements.

SUMMARY

To that end the present application concerns an inductive presence or position sensor or detector of the type comprising as its sensitive element, preferably defining a front working plane of the sensor, a coil system forming an air-core transformer arrangement with a primary coil or winding and a secondary coil or winding, said primary coil or winding of said system being associated with a capacity component in order to constitute a LC oscillating circuit whose oscillation is sustained by an adapted generator in the form of an operational amplifier and an associated resistance arrangement, the sensor also comprising signal processing means, for example signal adding, amplifying, converting and/or evaluating circuits, fed by at least one signal provided by at least one component of the coil system, inductive sensor characterized in that it comprises a direct or indirect feedback line from the secondary coil or winding to the input of the operational amplifier of the generator.

The present concepts will be better understood thanks to the following description and drawings of different embodiments of said invention given as non limiting examples thereof.

DETAILED DESCRIPTION

Figure 1:
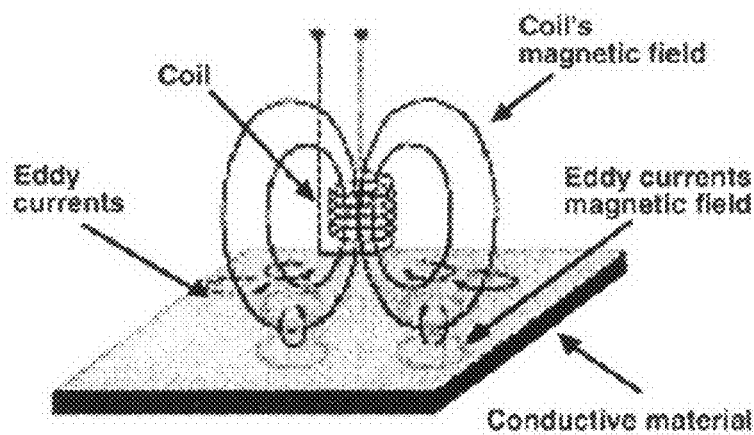
FIG. 1 is a diagrammatic illustration of an electromagnetic relationship between magnetic fields and eddy currents.

As shown on FIGS. 2 and 4 to 7, the concerned sensor or detector 1 is of the type comprising as its sensitive element, preferably defining a front working plane of the sensor, a coil system 2, 3 forming an air-core transformer arrangement with a primary coil or winding 2 and a secondary coil or winding 3. Said primary coil or winding 2 of said system 2, 3 is associated with a capacitive component 4 in order to constitute a LC oscillating circuit whose oscillation is sustained by an adapted generator 5 in the form of an operational amplifier 6 and an associated resistance arrangement 7. The sensor 1 also comprises signal processing means 8, 9, 10, for example signal adding, amplifying, converting and/or evaluating circuits, fed by at least one signal provided by at least one coil component 2 or 3 of the coil system 2, 3.

In accordance with one aspect, said sensor or detector 1 comprises a direct or indirect feedback line 11 from the secondary coil or winding 3 to the input of the operational amplifier 6 of the generator 5.

Figure 2:
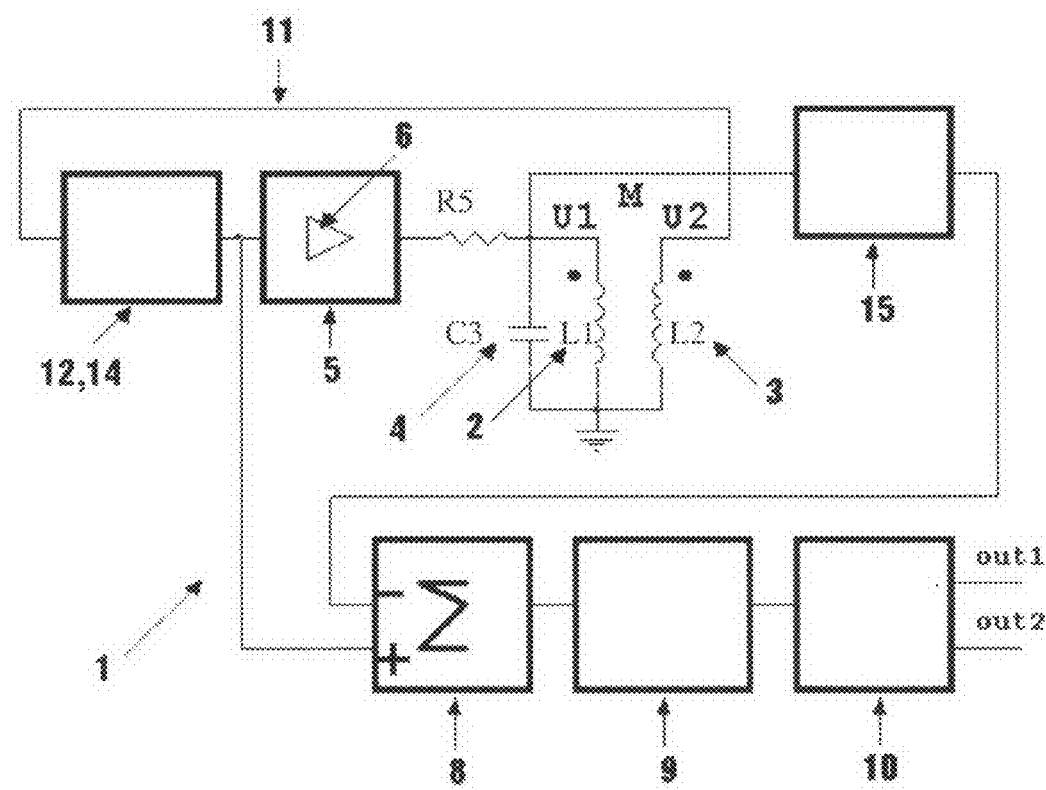
FIG. 2 is a functional representation of a detector or sensor according to the invention.

The general operating principle of the sensor 1 can for example be explained in relation with FIG. 2.

When the coil system 2, 3 is approached by a target 13 (see FIG. 10) of ferrous metal, the loss due to target eddy currents in the metal causes the decline of the q-factor of the LC circuit 2, 4 and of the amplitude of the sinusoidal oscillations of the U1 voltage. This, in turn, causes the decline of U2 voltage oscillation amplitude at the air transformer secondary winding output.

When the coil system 2, 3 is approached by a non-ferrous target, the q-factor of the LC circuit 2, 4 remains practically unchanged and the amplitude of the U1 oscillations stays more or less constant. However, the degree of inductive coupling of the coils 2 and 3 decreases due to the diminishing value of the mutual induction factor M. Consequently, the oscillations at the secondary winding 3 output have smaller amplitude.

Preferably, the feedback line 11 comprises a low-stop filter 12, in particular effective for frequencies below a few hundred Hertz, preferably below 60 Hz.

This high-pass or low-stop filter 12 is provided to ensure stability of circuit generation when exposed to external alternating magnetic fields of industrial frequency. Indeed, even if the circuit sensitive element (coil system 2, 3) has no core of ferromagnetic material, generation conditions can be affected by electromagnetic blast on windings 2 and 3. Since industrial frequencies (around 50 or 60 Hz) differ by orders from the sensor generator 5 operating frequency (hundreds of KHz), the noise signal can be effectively suppressed by such a low-stop filter 12, for example in the form of a double R-C circuit (see FIG. 7).

Figure 3:
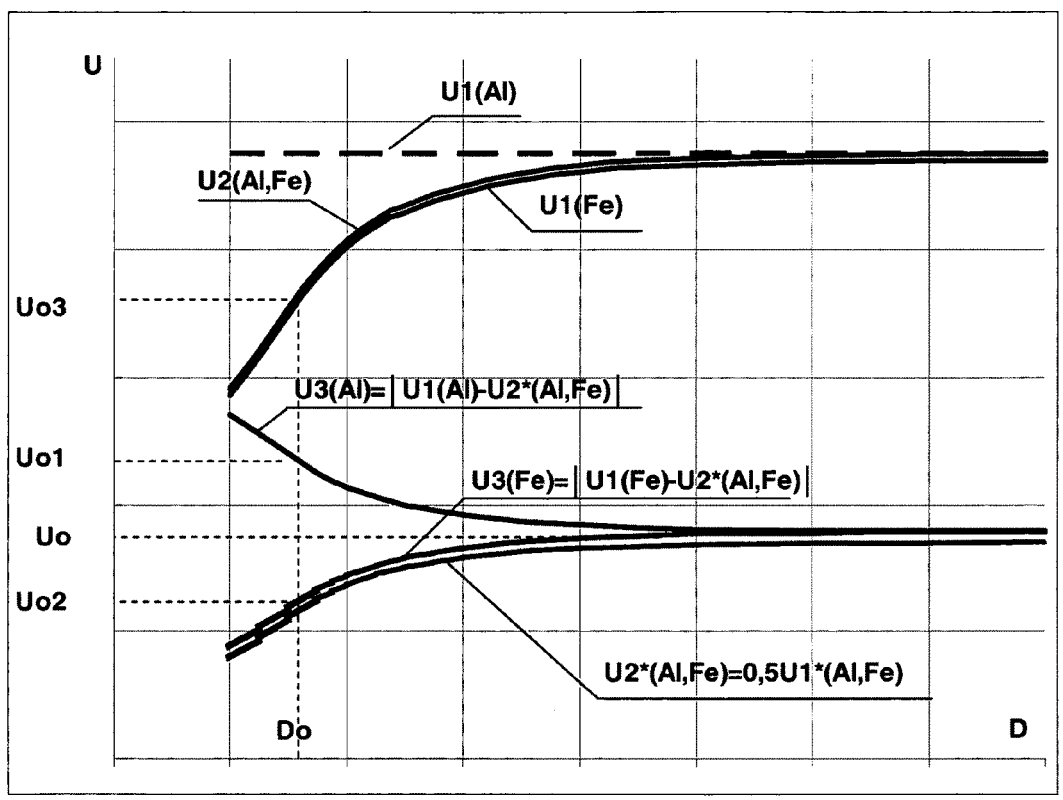
FIG. 3 is a graphical diagram illustrating the evolutions of various voltages or differential voltages related to the primary and/or secondary coil(s) or winding(s) forming part of the sensitive component of the sensor of FIG. 2.
Figure 8:
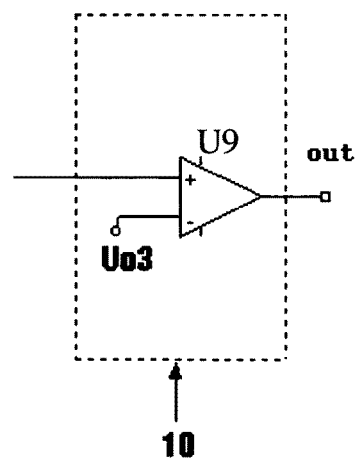
FIG. 8 is a detailed diagram of the comparative circuit (decision box or logical unit) used when only the position of the target has to be detected.

According to a first embodiment, in connection with FIGS. 3 and 8, there is provided a basic embodiment of the invention wherein the sensor 1 delivers a single detection signal indicative of only a position information of a target object 13 with respect to the front working plane 1' of the sensor 1, based on a single measurement signal representative of the voltage U2 at the secondary coil or winding 3.

Figure 5:
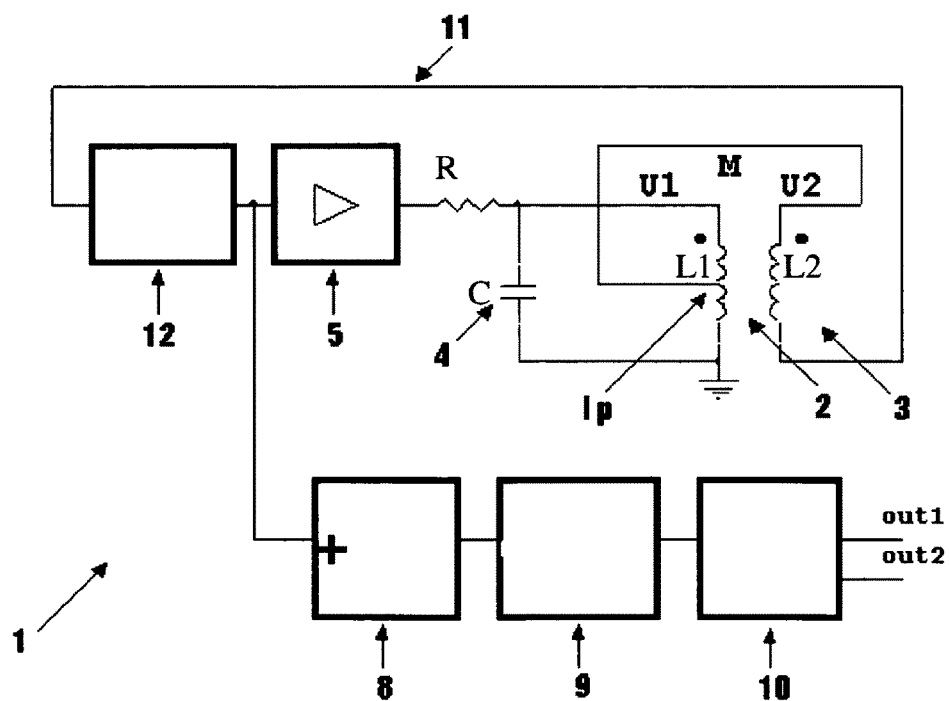
Figure 6:
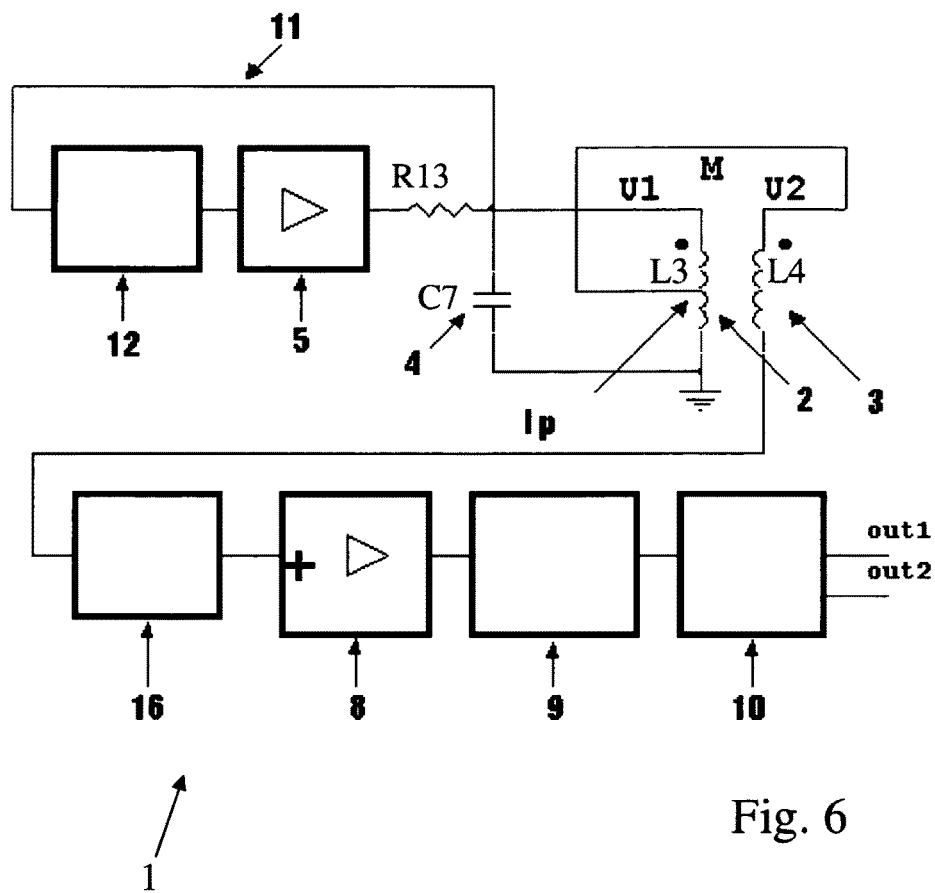

In accordance with a second embodiment, in connection with FIGS. 2, 5 and 6, there are provided more elaborate embodiments wherein the sensor 1 delivers a double detection signal indicative of a combined information of both position and constitutive material of a target object 13 approaching the front working plane 1' of the sensor 1, said combined information signal being based on (a) measurement signal(s) provided to the processing means 8, 9, 10 and representative of the voltages U1 and U2 respectively at the primary and at the secondary coil or winding 2, 3.

Figure 7:
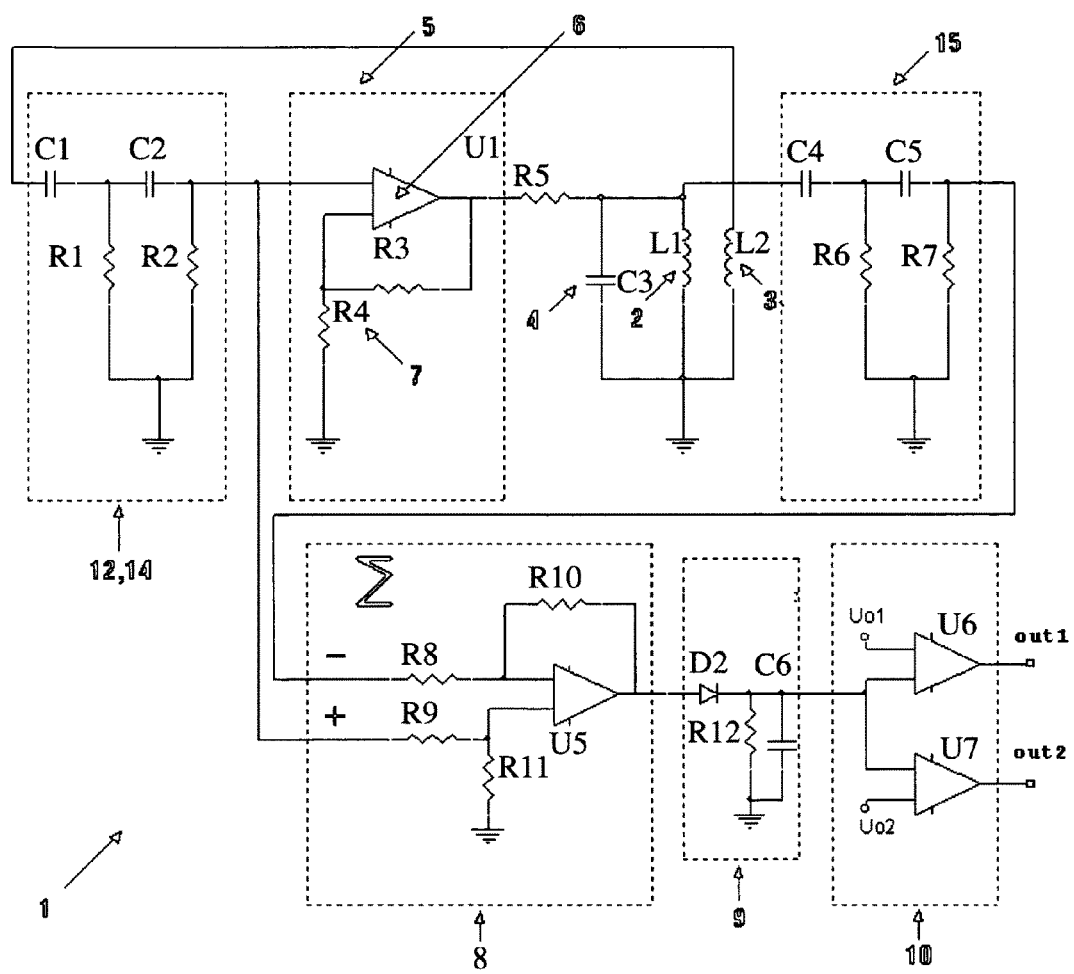
FIG. 7 is a detailed diagram of a possible practical layout of the sensor of FIG. 2.

In order to acquire interference free signals, it is preferred that the measurement signal representative of the voltage U2 is picked up at the exit of a low-stop filter 14, preferably the low-stop filter 12 incorporated in the feedback line 11 and that the measurement signal representative of the voltage U1 is also picked up through a low-stop filter 15 (FIG. 7).

Low-stop or high-pass filters 14 and/or 15 have preferably a structure similar to the low-stop filter 12, and serve the same purpose (suppression of noise generated by electromagnetic fields at industrial frequencies).

When the sensor or detector 1 has to provide a detection signal indicative of combined information (position and constituent material of the target object 13), the processing means can be fed with two different signals, one representative of the U1 voltage and another representative of the U2 voltage. Said signals are combined by means of an adder 8 with preset ratios (for example an operational amplifier arrangement as in FIG. 7) which outputs a differential signal |U2–k U1| further processed by the following processing means 9, 10.

As an alternative, the measurement signal provided to the processing means 8, 9, 10 is representative of the differential voltage |U2–k U1|, said measurement signal being picked up at one end of the secondary coil or winding 3, preferably through a low-stop filter 12 or 15 (having a similar structure), the other end of said latter being connected to a determined intermediate position IP of the primary coil or winding 2, which defines the value of the coefficient k.

In this case, the adder can be replaced by a simple amplifier 8 (see FIGS. 5 and 6).

As shown on FIGS. 2 and 4 to 7, the processing means preferably comprise, as components of a signal treatment chain, an adder with two inputs or a one way amplifier as a first chain component 8, an AC/DC converter circuit as a second chain component 9 and a comparative circuit as a third chain component 10, said latter issuing one or two logical output signal(s), depending of the number or the type of the input signal(s) at the first chain component 8.

Converter 9 converts the sinusoidal signal applied to its input to a constant voltage level proportionate to the input amplitude.

The comparative circuit or decision box 10 initiates a logic signal at the first output (out 1) with a target of ferrous metal approaching, and at the second output (out 2), with a target of non-ferrous metal approaching (in relation to embodiments of FIGS. 2, 5, 6 and 7).

The evolutions of various signals with different types of targets approaching the front working plane 1' and the sensitive element (coil system 2 and 3) are illustrated by FIG. 3:

curve U1(Al) describes the amplitude variation of the voltage signal in point U1 of the sensor circuit when a target of non-ferrous metal is approaching;

curve U1(Fe) describes the amplitude variation of the voltage signal in point U1 of the sensor circuit when a target of ferrous metal is approaching;

curve U2(Al,Fe) describes the amplitude variation of the voltage signal in point U2 of the sensor circuit when a target of any metal is approaching;

curve U2*(Al,Fe) shows the amplitude of the linearly converted signal U2 (U2*=kU2, where k=0.5 in the example shown on the diagram (when working the sensor 1, the magnitude of coefficient k can be set by a choice of turns ratio in windings 3 (L2) and 2 (L1), namely, k=W2/W1 where W2 and W1 are the number of turns in windings L2 and L1, respectively);

curves U3(Al) und U3(Fe) illustrate the signal amplitude variation at the output of adder 8 when a target 13 respectively made of non-ferrous metal U3(Al) and of ferrous metal U3(Fe) approaches the detector or sensor 1.

As seen from the graphical diagrams of FIG. 3, the approaching of a target 13 of non-ferrous metal (curve U3(Al)) results in an increasing amplitude of the signal at the output of adder 4 with respect to the initial level Uo, while the approach of a ferrous metal target (curve U3(Fe)) leads to its decrease. By comparing these output signals with thresholds Uo1 and Uo2, an approach of a target 13 at a distance Do (from the working plane 1') can be detected, as well as the type of material this target 13 is made of.

Figure 4:
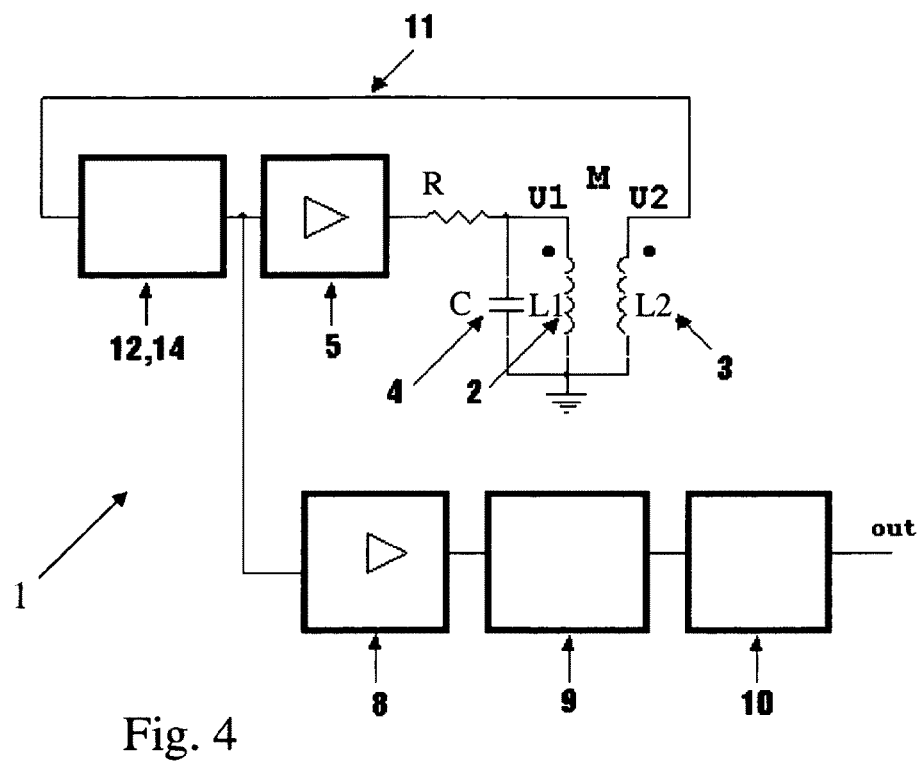
FIGS. 4, 5 and 6 are functional representations of other embodiments of the sensor according to the invention.

A possible layout of the circuit components of sensor 1, in connection with the constructive and functional embodiment of FIG. 2, is shown on FIG. 4. The details disclosed by this drawing are self explanatory for a man skilled in the art, in particular when reading the present specification.

Nevertheless, one should notice that, when tuning the sensor circuit, resistors R3, R4 are advantageously chosen so that despite any possible parameters variety of any other circuit components, no suppression of oscillation can possibly take place.

Thresholds Uo1 and Uo2 are preferably selected so that the comparators of the decision box (or comparing circuit) 10 operate when targets 13 reach a preset distance.

As indicated before, subtraction of signals with the necessary coefficients can be obtained directly in the coil system 2, 3.

To achieve this, winding 3 (L2) is connected to a top or intermediate position IP of winding 2 (L1) as shown in FIG. 5 or FIG. 6. The windings 2 and 3 are thus opposite-connected and their signals are subtracted. Choosing the signal subtraction coefficients is done by selecting the place of the connecting point Ip from winding L1 and by the number of turns in winding L2.

The circuit diagrams shown in FIG. 5 and FIG. 6 differ only by the location of the feedback connection to the generator 5 input (through low-stop filter 12), whereas in both cases the differential amplifier forming an adder 8 (as in FIGS. 2 and 7) is replaced (in both circuits) by a common amplifier having an uncomplemented output (out) only.

If it is unnecessary to distinguish between the materials of the target 13, the detector or sensor 1 can be embodied according to the diagram shown in FIG. 4. In this case a target (of any metal) approaching decision, regarding a preset distance Do, is made upon signal U2(Al,Fe) amplitude dropping to a value less than Uo3. The upper comparator U6 and the first output out1 shown in FIG. 7 can be omitted from the decision-making circuit 10 and said latter comprises only one comparator as shown in FIG. 8.

Figure 9:
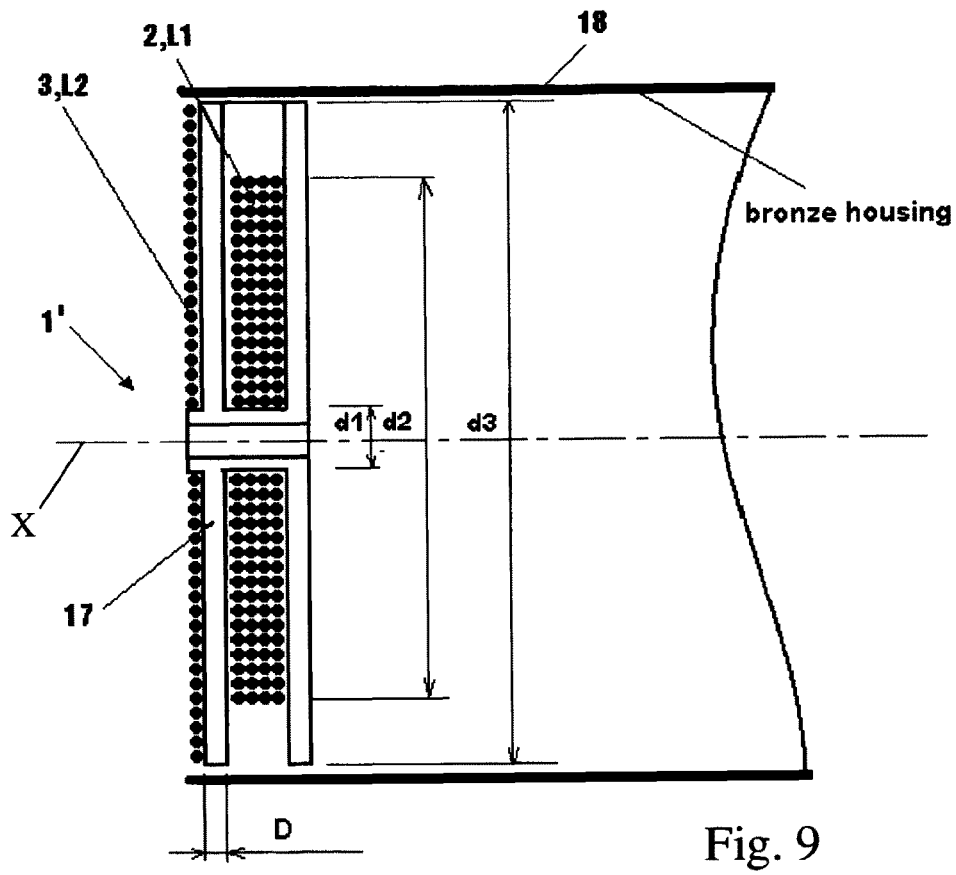
FIG. 9 is a sectional view along their axis of the primary and secondary coils or windings and of the sensor housing according to a practical embodiment of the invention; and, FIG. 10 is a cross-sectional view of the sensor mounted in a support in combination with a sensed object.

A possible design of the system of coils 2 and 3 of the sensor 1 is shown in FIG. 9.

Preferably, the primary and secondary coils or windings 2 and 3 are mounted coaxially on a non-ferrous and a non-magnetic support 17, preferably made of plastic material, the central axis X of said coils or windings 2 and 3 extending perpendicularly to the front working plane 1' of the sensor 1 and the secondary coil or winding 3 being situated proximate to said front working plane 1'.

As can be seen from FIG. 9, it is also preferred that the secondary coil or winding 3 has a flat structure with a large diameter compared to its thickness in its axial direction, the diameter of said secondary coil or winding 3 being at least slightly greater than the diameter of the primary coil or winding 2.

Furthermore, the primary coil or winding 2 is situated at a distance D from the secondary coil or winding 3 in the direction opposite the front working plane 1', said distance D being adjusted in order for the sensor 1 to provide a uniform response signal for an approaching target object 13, whether the latter is made of ferrous or of non-ferrous material.

Indeed, for the sensor 1 to have maximum sensitivity, coil 3 (L2) should be as flat as possible with the largest possible diameter. The slim construction of coil 3 enables the entire coil system 2, 3 as a whole to be brought as close to the front working plane 1' and to the target 13 as possible, while the greater the diameter of this coil 3, the greater the number of magnetic lines of force induced by eddy currents in the target which cross its turns.

To rule out the effect of the base material when flush mounting the sensor 1, coil 2 (L1) should be constructed to have its diameter a few millimeters less than that of coil 3 (L2). This is decrease the density of magnetic lines of force crossing the detector body (housing+components) and the material of the support member into which the detector 1 is mounted or screwed, which decreases their effect on oscillating circuit parameters, correspondingly.

Preferably, the detector body or housing 18 (FIG. 10) should be of non-ferrous metal having low active resistance and, correspondingly, a thin skin layer. In this case the detector body shall act as a magnetic screen subduing the effect of the base material. Since currents flowing in coil 3 (L2) are insignificant as compared with those of coil 2 (L1), their interaction with the detector body 18 and with the support member can be neglected and the coil 3 can be made with the maximum diameter accommodated by design.

For the detector or sensor 1 to respond uniformly (i.e. produce the same signal amplitude variation at the decision box 10 input with a target approaching a selected distance), the primary coil or winding 2 is situated at a distance D from the secondary coil or winding 3 in the direction opposite the front working plane 1', said distance D being adjusted in order for the sensor 1 to provide a uniform response signal for an approaching target object 13, whether the latter is made of ferrous or of non-ferrous material.

Figure 10:
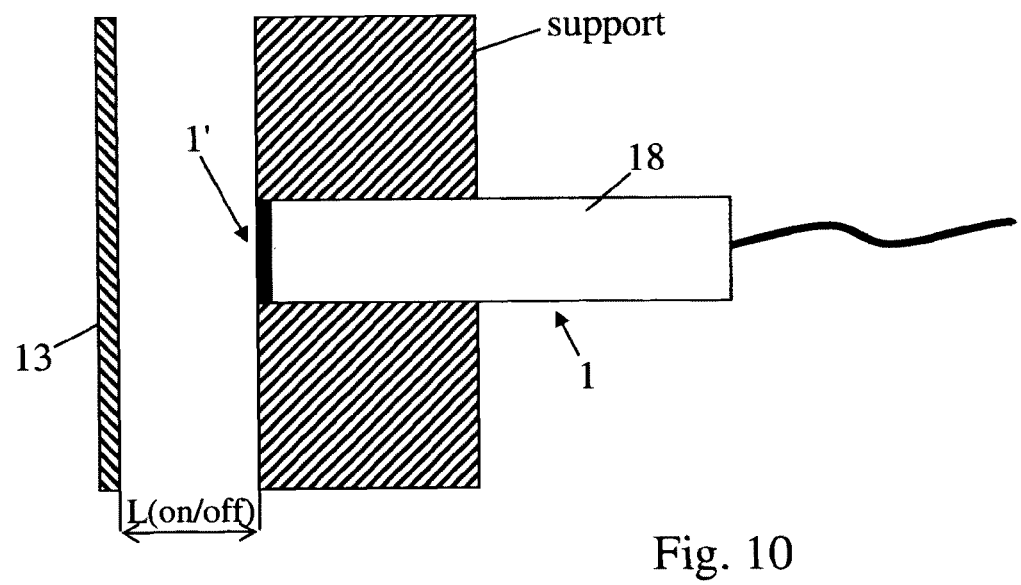

To check the proper operation, a sensor model corresponding to FIG. 4 was assembled, in which the coil system 2 and 3 was placed inside a body of brass 18 which was actually a diameter 18 pipe with a 1 mm thick wall, and tested (see FIG. 10).

The coils 2 and 3 were wound on a plastic frame 17 having the following dimensions: d1=3.5 mm, d3=13 mm, D=1 mm. Coil 2 (L1) was wound with a 0.22 mm diameter wire, had 56 turns and a diameter d2=10 mm. Coil 3 (L2) had 28 turns of a 0.16 mm diameter wire and had a diameter d3=13 mm.

In the table below are listed operation ranges of the detector model vs. material of the target selected and material of the base into which the detector was embedded (experimentally obtained for the above design). A drawing is shown in FIG. 10 that illustrates the principle of the experiment.

| | Target material | | | | | |
|---|---|---|---|---|---|---|
| | Cu | | Al | | Fe | |
| | Distance L(on/off) | | | | | |
| Stand material | On(Cu) (mm) | Off(Cu) (mm) | On(Al) (mm) | Off(Al) (mm) | On(Fe) (mm) | Off(Fe) (mm) |
| plastic | 4.7 | 5.2 | 4.9 | 5.4 | 5.4 | 6.0 |
| Fe | 4.8 | 5.3 | 5.0 | 5.5 | 5.5 | 6.1 |
| Al | 4.7 | 5.2 | 4.9 | 5.4 | 5.4 | 6.0 |

As seen from the tabulated data the operation range does not depend on the material of the support member or base into which the detector 1 is embedded and is only slightly dependent on the material of the target 13.

An experiment was also performed that proved that the sensor 1 was still functional even when exposed to the effect of constant or alternating magnetic fields of 50 Hz of up to 200 millitesla.

The present invention is of course not limited to the preferred embodiments described and represented herein, changes can be made or equivalents used without departing from the scope of the invention.

The invention claimed is:

1. An inductive presence or position sensor or detector comprising:
   a coil system forming an air-core transformer arrangement with a primary coil or winding and a secondary coil or winding;
   said primary coil or winding of said coil system being connected with a capacitive component to form a LC oscillating circuit whose oscillation is sustained by an operational amplifier and an associated resistance arrangement;
   a signal processing assembly fed by at least one signal provided by at least one of the primary and secondary coils or windings of the coil system;
   a direct or indirect feedback line from the secondary coil or winding to an input of the operational amplifier, wherein the sensor delivers a double detection signal based on at least one measurement signal provided to the signal processing assembly and representative of voltages at the primary and at the secondary coil or winding, said double detection signal being indicative of both position and constituent material of a target object approaching a front working plane of the sensor.

2. The inductive sensor according to claim 1, wherein the feedback line comprises a high-pass filter Hertz between the secondary coil or winding and the operational amplifier effective to block frequencies below a few hundred.

3. The inductive sensor according to claim 1, wherein the sensor delivers a single detection signal indicative of only a position information of a target object with respect to a front working plane of the sensor, based on a single measurement signal representative of a voltage at the secondary coil or winding.

4. The inductive sensor according to claim 3, wherein the measurement signal representative of the voltage at the secondary coils or windings is picked up at an output of a first high-pass filter connected between the secondary coils or windings and the operational amplifier.

5. The inductive sensor according to claim 4, wherein the measurement signal representative of the voltage is picked up through a second high-pass filter connected between the air-core transformer and the signal processing assembly.

6. The inductive sensor according to claim 4, wherein the measurement signal representative of the voltages is picked up through a high-pass filter.

7. The inductive sensor according to claim 4, wherein the high-pass filter is incorporated in the feedback line.

8. The inductive sensor according to claim 1, wherein the processing assembly comprises:
   an adder with two inputs as a first chain component;
   an AC/DC converter circuit as a second chain component; and,
   a comparator circuit as a third chain component, said third chain component issuing two logical output signals.

9. The inductive sensor according to claim 1, wherein the primary and secondary coils or windings are mounted coaxially on a non-ferrous and non-magnetic support, a common axis of said coils or windings extending perpendicularly to a front working plane of the sensor and the secondary coil or winding being situated proximate to said front working plane.

10. The inductive sensor according to claim 9, wherein the secondary coil or winding has a flat structure with a large diameter compared to its thickness in its axial direction, the diameter of said secondary coil or winding being greater than the diameter of the primary coil or winding.

11. The inductive sensor according to claim 9, wherein the primary coil or winding is situated at a distance from the secondary coil or winding in the direction opposite the front working plane, said distance being such that the sensor provides a uniform response signal for an approaching target object, whether the latter is made of ferrous or of non-ferrous material.

12. The inductive sensor according to claim 9, wherein the secondary coil or winding has a flat structure with a large diameter compared to its thickness in its axial direction, the diameter of said secondary coil or winding being greater than a diameter of the primary coil or winding.

13. The inductive sensor according to claim 1, wherein the measurement signal representative of the voltage at the primary and secondary coils or windings is picked up at an output of a high-pass filter.

14. The inductive sensor according to claim 13, wherein the high-pass filter is incorporated in the feedback line.

15. An inductive presence or position sensor or detector comprising:
   a coil system forming an air-core transformer arrangement with a primary coil or winding and a secondary coil or winding;
   said primary coil or winding being associated with a capacitive component to constitute a LC oscillating circuit whose oscillation is sustained by an operational amplifier and an associated resistance arrangement;
   signal processing assembly fed by at least one signal provided by at least one of the primary and secondary coils or windings of the coil system;
   a direct or indirect feedback line from the secondary coil or winding to an input of the operational amplifier;
   wherein a measurement signal is provided to the signal processing assembly, said measurement signal being picked up at one end of the secondary coil or winding, the other end of said secondary coil or winding being connected to a determined intermediate position of the primary coil or winding, such that the measurement signal is representative of a difference between a first volgate (U2) at the one end of the secondary coil and a differential voltage which is a difference between the first voltage and a second voltage at the intermediate position of the primary coil or winding.

16. The inductive sensor according to claim 15, wherein the processing assembly comprises:
- an amplifier as a first chain component;
- an AC/DC converter circuit as a second chain component; and,
- a comparator circuit as a third chain component, said third chain component issuing a logical output signal.

17. The inductive sensor according to claim 15, wherein the primary and secondary coils or windings are mounted coaxially on a non-ferrous and non-magnetic support, a common axis of said coils or windings extending perpendicularly to a front working plane of the sensor and the secondary coil or winding being situated proximate to said front working plane.

* * * * *